UNITED STATES PATENT OFFICE.

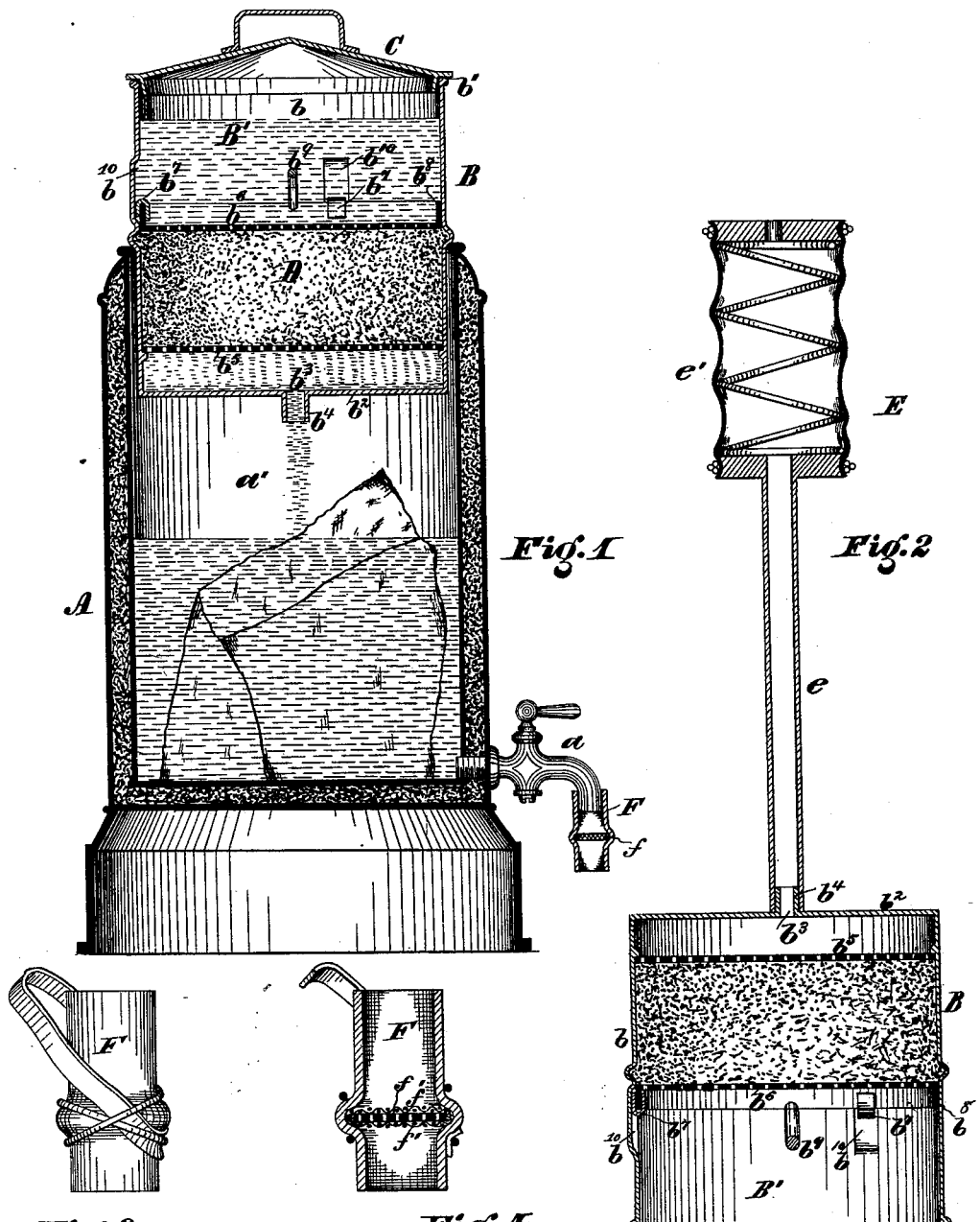

ISIDOR BRACH, OF PHILADELPHIA, PENNSYLVANIA.

IMPROVEMENT IN WATER-FILTERS.

Specification forming part of Letters Patent No. 218,424, dated August 12, 1879; application filed May 15, 1879.

*To all whom it may concern:*

Be it known that I, ISIDOR BRACH, of Philadelphia, in the county of Philadelphia and State of Pennsylvania, have invented certain new and useful Improvements in Water Filters; and I do hereby declare the following to be a full, clear, and exact description of the invention, such as will enable others skilled in the art to which it pertains to make and use it, reference being had to the accompanying drawings, which form part of this specification, in which—

Figure 1 is a longitudinal vertical section of a water-cooler illustrating my improvements applied thereto. Fig. 2 is a vertical section of the filter and cleansing device; and Figs. 3 and 4 are, respectively, a side elevation and a vertical section of the strainer.

My invention has relation, principally, to means whereby water-filters may be cleansed, purified, and aerated; and my improvements in this connection consist in the peculiar construction of such filters, whereby they are adapted for the reception of syringes or equivalent devices which are adapted to force air and water through the carbon or filtering medium; also, in the combination, with a water-filter, of a syringe, or equivalent injector, for aerating, cleansing, and purifying the filtering medium.

My invention has relation, further, to a construction of water-filters which will render the same adaptable for use either with a siphon, in which case the water will be drawn upwardly through the filtering medium, or with a water-cooler, in which event the fluid will pass downwardly, owing to its static force, through such medium.

My invention has relation, further, to means whereby the impurities released by the melting of ice in filtered water will be caught; and my improvements in this connection relate to the provision of a strainer, consisting of a perforated disk covered on both sides with fine wire-gauze, and located within an india-rubber tube adapted for attachment to the exit-port of a water-cooler.

My improvements further consist in certain details of construction hereinafter fully set forth.

Referring to the accompanying drawings, A indicates a water-cooler of the usual or any suitable construction, which in itself forms no part of my present invention.

B represents a water-filter, so constructed that it may be set upon and depend into the cooler A. Said filter consists of a cylinder, $b$, having an open end, $b^1$, adapted for the reception of a lid, C, which may be the cover of the water-cooler A. The cylinder $b$ has a bottom or end, $b^2$, with a single central opening, $b^3$, in a projecting neck, $b^4$. Within the cylinder, and a short distance above the bottom $b^2$, is a fixed foraminated diaphragm, $b^5$.

D represents carbon or other filtering medium, which rests upon the diaphragm $b^5$, and $b^6$ is another foraminated diaphragm which rests upon said carbon, and is held in place by lugs $b^7$, secured to the walls of the cylinder. Said diaphragm is formed with an annular flange, $b^8$, and has a bail, $b^9$, whereby it may be lifted out of the cylinder $b$ on bending back the lugs $b^7$. Above diaphragm $b$ is the water-chamber B'.

E represents a syringe, consisting of a flexible tube, $e$, and compression ball or cylinder $e'$. Said tube $e$ is adapted to fit on the neck $b^4$, to operate either as a siphon or for cleansing the filter, as hereinafter set forth.

$a$ represents the exit-port or faucet of the water-cooler, and F a piece of gum tubing attached thereto. Within said tubing is a perforated disk, $f$, covered on either side by fine wire-gauze $f'$ $f'$.

The operation is as follows: Used in connection with the water-cooler A, the parts occupy the positions and are arranged as shown in Fig. 1. The water poured in the filter and held in chamber B' passes through the diaphragms $b^5$ $b^6$ and filtering medium D, finding its way through the neck $b^4$ to the ice-chamber $a'$.

Any impurities released from the ice by fusion or melting produced by the water will be caught by the strainer in the tube F.

To cleanse, purify, and aerate the filtering medium D from time to time as it becomes foul from use, the filter is inverted on the cooler A and the syringe E applied thereto, forcing water and air through such medium.

If desired, the filter may be used with the syringe E as a siphon-outlet. In such case the filter is located in a vessel of water with the tube $e$ hanging over the side of such vessel and forming a siphon. By duly compressing the expanding cylinder $e'$ the water will start flowing, and will continue until the supply is exhausted. Owing to the diaphragm $b^5$ being located some distance from the end $b^2$, when the siphon is used the water will be drawn through all the openings in said diaphragm, the fluid being thereby caused to circulate throughout the entire mass of carbon, and to distribute its impurities accordingly.

When the strainer F becomes foul it may be reversed and thereby be cleaned.

The annular flange $b^8$ strengthens the diaphragm $b^6$, and prevents injury in lifting the latter in making examination to ascertain the condition of the carbon. Such examination should be frequently made, and the filtering medium cleansed whenever found foul, and by having the diaphragm removable this is readily permitted.

By means of the syringe the filtering medium may be thoroughly cleansed and purified without removal from the cylinder, and hence may be used without change for many years.

The lugs $b^7$ are of metal, which will permit bending without breaking, and they rest in recesses $b^{10}$ in the walls of the cylinder. When straightened out they do not obstruct the introduction and removal of the diaphragm, and when bent over the flange $b^8$ they secure said diaphragm in place, while permitting its ready detachment for the purpose suggested.

What I claim as my invention is—

1. The reversible filter B, composed of cylinder $b$, with end $b^2$, having neck or outlet $b^3$, foraminated diaphragms $b^5 b^6$, filtering medium D, and water-chamber B', whereby the same may be used as a water-cooler filtering downwardly, or in connection with a siphon filtering upwardly, substantially as shown and described.

2. The filter B, provided with means, substantially as shown, whereby a syringe-tube, $e$, may be attached for cleansing and aerating the filtering medium, as set forth.

3. The reversible strainer composed of flexible tube F, with perforated disk $f$ and wire-gauze coverings $f' f'$, substantially as shown and described.

4. The combination, with cylinder $b$, formed with recesses $b^{10}$, of lugs $b^7$ and removable diaphragm $b^6$, having annular flange $b^8$, substantially as shown and described.

5. The combination of cooler A, reversible filter B, and strainer F, substantially as shown and described.

In testimony that I claim the foregoing I have hereunto set my hand.

ISIDOR BRACH.

Witnesses:
   AL. P. BURCHELL,
   SAML. J. VAN STAVOREN.